US012172406B2

(12) United States Patent
Huh et al.

(10) Patent No.: US 12,172,406 B2
(45) Date of Patent: Dec. 24, 2024

(54) DEVICE FOR MANUFACTURING DOUBLE WALLED PAPER CUPS

(71) Applicant: HYUNJIN CO., LTD, Ansan-si (KR)

(72) Inventors: Sung Hak Huh, Seoul (KR); Jin Yang Jung, Incheon (KR); Dong Yong Park, Siheung-si (KR); Hyun Sung Jung, Incheon (KR); Yeong Jin Seon, Seoul (KR); Ki Hong Nam, Siheung-si (KR); Chan Woong Moon, Siheung-si (KR)

(73) Assignee: HYUNJIN CO., LTD, Gyeonggi-do (KR)

( * ) Notice: Subject to any disclaimer, the term of this patent is extended or adjusted under 35 U.S.C. 154(b) by 264 days.

(21) Appl. No.: 17/937,166

(22) Filed: Sep. 30, 2022

(65) Prior Publication Data

US 2023/0373184 A1 Nov. 23, 2023

(30) Foreign Application Priority Data

May 20, 2022 (KR) ........................ 10-2022-0062005

(51) Int. Cl.

| | |
|---|---|
| ***B31B 50/62*** | (2017.01) |
| ***B31B 50/28*** | (2017.01) |
| *B31B 110/20* | (2017.01) |
| *B31B 120/40* | (2017.01) |

(52) U.S. Cl.

CPC ............ *B31B 50/622* (2017.08); *B31B 50/28* (2017.08); *B31B 2110/20* (2017.08); *B31B 2120/40* (2017.08)

(58) Field of Classification Search

CPC ... B31B 50/622; B31B 2110/20; B31B 50/28; B31B 2120/40; B31B 50/624; B31B 50/88; B31B 2110/10

See application file for complete search history.

(56) References Cited

U.S. PATENT DOCUMENTS 4,490,130 A * 12/1984 Konzal ............... B29C 65/7882 493/134
5,992,489 A * 11/1999 Busse .................... B31D 1/005 156/499
6,663,926 B1 * 12/2003 Okushita .................. B65D 3/22 428/34.2

(Continued)

*Primary Examiner* — Andrew M Tecco
*Assistant Examiner* — Nicholas E Igbokwe
(74) *Attorney, Agent, or Firm* — HOLZER PATEL DRENNAN

(57) ABSTRACT

A device for manufacturing a double-walled paper cup by combining an inner cup and an outer cup using hot-melt comprising: an outer cup forming part which includes: a turret provided with outer cup mandrels; and an enclosing means forming an outer cup; an outer cup transporting part which includes: a rotational transporting means which has circular slits; an outer cup inserting means which inserts the outer cup into the circular slit; a shaft that moves up and down; a first pusher that firmly restrains the outer cup into the circular slit; and a second pusher for separating the outer cup from the circular slit; and an outer cup combining part which includes: a rotating table provided with rotatable inner cup mandrels; a rotating pocket which rotates the inner cup mandrel; and a first hot-melt spraying nozzle that applies the hot-melt to an outer surface of the inner cup.

10 Claims, 7 Drawing Sheets

(56) References Cited

U.S. PATENT DOCUMENTS

| | | | | |
|---|---|---|---|---|
| 2006/0124719 | A1* | 6/2006 | Mannlein ................. | B65D 3/14<br>229/403 |
| 2008/0280743 | A1* | 11/2008 | Stahlecker ............... | B65D 3/22<br>493/106 |
| 2017/0119183 | A1* | 5/2017 | Bonney ................. | B31B 50/322 |
| 2017/0340149 | A1* | 11/2017 | Morgan ............. | B65D 81/3869 |
| 2018/0370666 | A1* | 12/2018 | Garza ..................... | B65B 11/54 |

* cited by examiner

DEVICE FOR MANUFACTURING DOUBLE WALLED PAPER CUPS

CROSS REFERENCE TO RELATED APPLICATION

This application claims the benefit of priority to Korean Patent Application No. 10-2022-0062005, filed on May 20, 2022, the entire contents of which being incorporated herein by reference.

FIELD OF THE DISCLOSURE

The present disclosure relates to a device for manufacturing a double-walled paper cup by combining an inner cup and an outer cup using hot-melt; and more particularly, the device provided with a first pusher and a second pusher installed on a shaft, wherein the second pusher has a stronger stroke than the first pusher through a rack-pinion gear so as to allow the second pusher to push the outer cup strongly toward the inner cup.

BACKGROUND OF THE DISCLOSURE

Recently, paper cups are used to contain beverage. However, in case of high temperature beverage such as hot coffee or low temperature beverage with ice, a surface of a conventional paper cup may become extremely hot or cold according to the beverage. This will make it difficult to hold the cup, which greatly reduces a portability of the paper cup.

To address this problem, an outer cup may be added to the conventional paper cup to form an insulation layer between the outer cup and the conventional paper cup, i.e., an inner cup. This will prevent the surface of the conventional paper cup from becoming extremely hot or cold, which can lead to improvement of the portability of the paper cup.

Therefore, demand for double-walled paper cups as such with improved portability has increased and devices for manufacturing the double-walled paper cups have been developed. However, the devices for manufacturing the double-walled paper cups have problems of imprecise combination of the inner cup and the outer cup. For example, the outer cup may be combined with the inner cup with the outer cup being tilted, or the outer cup may be combined with the inner cup at a position higher or lower than the precise position to be combined. Thus, an enhanced device for precisely combining the inner cup and the outer cup is needed.

SUMMARY OF THE DISCLOSURE

It is an object of the present disclosure to solve all the aforementioned problems.

It is another object of the present disclosure to combine an inner cup and an outer cup precisely by allowing a second pusher to have a stronger stroke than a first pusher through a rack-pinion gear so as to allow the second pusher to push the outer cup strongly toward the inner cup.

It is still another object of the present disclosure to return a hot-melt spraying nozzle to its initial position by using a cylinder when the hot-melt spraying nozzle is out of its initial position.

It is still yet another object of the present disclosure to prevent the outer cup from escaping out of its predetermined position by using a mandrel guide mounted on a rotating table of an inner cup mandrel in order to accurately combine the outer cup with the inner cup.

In accordance with one aspect of the present disclosure, there is provided a device for manufacturing a double-walled paper cup by combining an inner cup and an outer cup using hot-melt comprising: an outer cup forming part which includes: a turret that rotates intermittently around a vertical axis perpendicular to a ground and is radially provided with a plurality of outer cup mandrels that have their corresponding central axes horizontal to the ground; and an enclosing means which is configured to allow an outer cup paper to surround a specific outer cup mandrel among the outer cup mandrels at an enclosing station, to thereby form an outer cup with a tapered shape; an outer cup transporting part which includes: a rotational transporting means which rotates intermittently around its horizontal axis horizontal to the ground and has a plurality of circular slits, wherein respective diameters of the circular slits are smaller than a diameter of an upper portion of the outer cup and larger than a diameter of a lower portion of the outer cup; an outer cup inserting means which takes the outer cup from the specific outer cup mandrel to insert the outer cup into a specific circular slit starting from the lower portion of the outer cup when the specific outer cup mandrel with the outer cup being surrounded is arrived at an outer cup ejecting station of the outer cup forming part; a shaft that moves up and down in the vertical direction in response to a motion of a cam and extends in the vertical direction; a first pusher that is connected to a first extension bar which is perpendicularly engaged with the shaft, and that firmly restrains the outer cup inserted into the specific circular slit among the circular slits by pushing the upper portion of the outer cup toward the specific circular slit; and a second pusher, engaged with a movable rack gear of a rack-pinion gear wherein a pinion gear in the rack-pinion gear is engaged with a second extension bar perpendicularly engaged with the shaft, for separating the outer cup which has been firmly restrained in the specific circular slit when the specific circular slit is arrived at a position of the second pusher by pushing the lower portion of the outer cup to an outside of the specific circular slit with a stronger stroke than the first pusher; and an outer cup combining part which includes: a rotating table that rotates intermittently and is radially provided with a plurality of rotatable inner cup mandrels; a rotating pocket which is configured to rotate a specific inner cup mandrel among the inner cup mandrels by contacting a specific driving shaft of the specific inner cup mandrel that extends to a lower outer region of the rotating table while the specific inner cup mandrel with an inner cup being provided thereto is located at a hot-melt station and the inner cup is applied with hot-melt at the hot-melt station; and a first hot-melt spraying nozzle that applies the hot-melt to an outer surface of the inner cup rotated by a rotation of the specific inner cup mandrel, wherein in a state where the inner cup provided with the hot-melt applied on its outer surface is positioned at a combining station, the outer cup separated from the specific circular slit by the second pusher is initially combined with the inner cup.

As one example, the outer cup combining part further includes: a first mounting block whose one end is rotatably engaged with a first fixed shaft; a second mounting block whose one end is rotatably engaged with a second fixed shaft, wherein a nozzle base with the first hot-melt spraying nozzle being rotatably combined is engaged with the second fixed shaft and wherein the nozzle base is fixedly engaged with a side of said one end of the second mounting block; and a cylinder whose body is rotatably engaged with the other end of the first mounting block and whose rod is rotatably engaged with the other end of the second mounting block, wherein a position of the first hot-melt spraying nozzle engaged with the nozzle base is adjusted according to a movement of the cylinder.

As another example, the rotating table further includes: a mandrel guide that guides a moving path of the outer cup separated from the specific circular slit by the second pusher along a plurality of guide bars vertically mounted thereon, wherein the guide bars are radially provided around the inner cup mandrel.

As another example, a device for manufacturing a double-walled paper cup by combining an inner cup and an outer cup using hot-melt further comprises an outer cup paper transporting part that transports an original paper along a paper transporting path by using at least one motor, and wherein the outer cup paper transporting part transforms the original paper to the outer cup paper by using an outer paper cup forming means placed on the paper transporting path and provides the outer cup paper to the outer cup forming part.

As another example, the outer cup paper transporting part further includes: a second hot-melt spraying nozzle which applies hot-melt on an outer surface of an overlapping portion of the outer cup paper.

As one example, the enclosing means includes: a folding wing that allows the outer cup paper to surround the specific outer cup mandrel when the outer cup paper is arrived at a lower part of the specific outer cup mandrel; and a seam clamp configured to apply pressure to an overlapping portion of the outer cup paper.

As another example, the outer cup combining part further includes: a preliminary hot-melt spraying nozzle that applies preliminary hot-melt on the outer surface of the inner cup rotated by the rotation of the specific inner cup mandrel when the hot-melt is not yet applied by the first hot-melt spraying nozzle, wherein the preliminary hot-melt spraying nozzle maintains a predetermined distance from the inner cup at a preliminary hot-melt station; and a cooling means that cools the preliminary hot-melt applied on the inner cup and then transports it to the hot-melt station.

As another example, the outer cup forming part further includes: a curling part that receives the specific outer cup mandrel with the outer cup paper being surrounded from the enclosing station and that curls a lower end of the outer cup inwards so as to form a curl, wherein the curl makes space between the inner cup and the outer cup at a time when the outer cup is combined with the inner cup.

As another example, the outer cup combining part further includes: a combining pusher that receives the specific inner cup mandrel with the inner cup being initially combined with the outer cup from the combining station and then applies pressure to the outer cup initially combined with the inner cup to thereby make a double-walled paper cup having the outer cup fixedly combined with the inner cup.

As another example, the rack-pinion gear includes a fixed rack gear, the pinion gear and the movable gear which is connected to the second pusher, wherein the fixed rack gear contacts the pinion gear, and the movable rack gear contacts the pinion gear at a position symmetrical to the fixed rack gear with respect to the pinion gear, and wherein the movable rack gear is configured to move in a same direction with a direction of a movement of the pinion gear according to the movement of the shaft.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION

Figure 1:
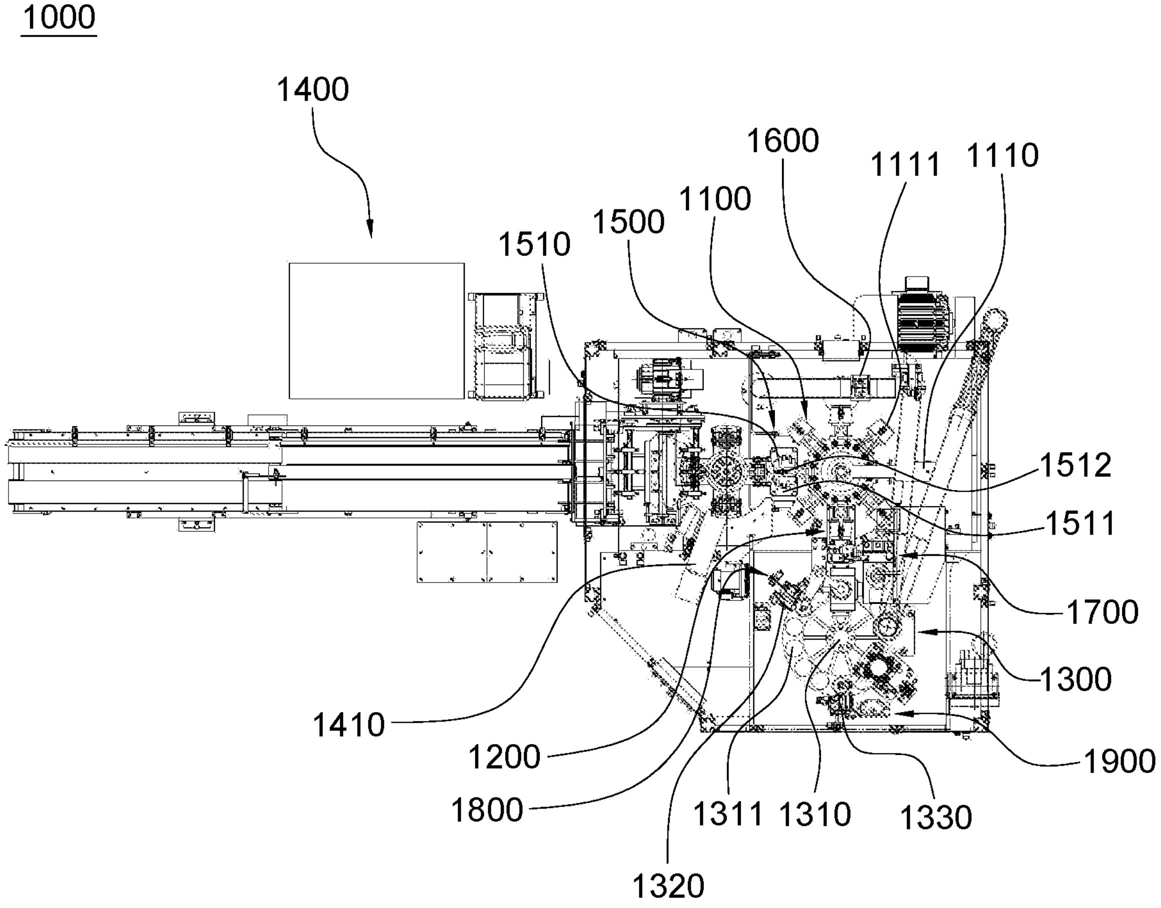
FIG. 1 is a drawing schematically illustrating a plane view of a device for manufacturing a double-walled paper cup in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

The headings and abstract of the present disclosure provided herein are for convenience only and do not limit or interpret the scope or meaning of the embodiments.

As used in this specification and the appended claims, the singular forms “a,” “an,” and “the” may include plural referents unless the content and context clearly dictates otherwise.

To allow those skilled in the art to carry out the present disclosure easily, the example embodiments of the present disclosure will be explained by referring to attached diagrams in detail as shown below.

FIG. 1 is a drawing schematically illustrating a plane view of an outer cup transporting part 1200 of a device 1000 for manufacturing the double-walled paper cup in accordance with one example embodiment of the present disclosure.

Referring to FIG. 1, the device 1000 for manufacturing the double-walled paper cup may include an outer cup forming part 1100 which has: a turret 1110 that rotates intermittently around a vertical axis perpendicular to a ground and is radially provided with a plurality of outer cup mandrels 1111 that have their corresponding central axes horizontal to the ground; and an enclosing means 1510 which is configured to allow an outer cup paper to surround a specific outer cup mandrel among the outer cup mandrels 1111 at an enclosing station 1500 to thereby form an outer cup with a tapered shape.

Herein, the outer cup basically has a smooth surface with the tapered shape, but wrinkles may be formed on an inner surface thereof to obtain better insulation effect. In addition, the shape of the outer cup mandrel 1111 may be a tapered shape in order to correspond to the shape of the outer cup.

Further, the enclosing means 1510 may include: a folding wing 1511 that allows the outer cup paper to surround the specific outer cup mandrel such that there is an overlapping portion between one end of the side surface of the outer cup paper and the other end of the side surface thereof when the outer cup paper is arrived at a lower part of the specific outer cup mandrel; and a seam clamp 1512 configured to apply pressure to the overlapping portion of the outer cup paper. As an example, the folding wing 1511 may be separated to a left folding wing and a right folding, wherein the left folding wing and the right folding wing may be correspond to the shape of the specific outer cup mandrel when combined. In addition, the seam clamp 1512 may form the outer cup by clamping and bonding the overlapping portion of the outer cup paper.

Additionally, the outer cup forming part 1100 may further include a curling part 1600 that receives the specific outer cup mandrel with the outer cup paper being surrounded from the enclosing station 1500 and that curls a lower end of the outer cup inwards so as to form a curl. Herein the curl makes space between the inner cup and the outer cup at a time when the outer cup is combined with the inner cup. The space between the inner cup and the outer cup made by the curl may prevent the heat of the inner cup from moving to the outer cup, which results in improving insulation of the double-walled paper cup.

Meanwhile, the device 1000 for manufacturing the double-walled paper cup may further include an outer cup paper transporting part 1400 that transports an original paper along a paper transporting path by using at least one motor. In detail, the outer cup paper transporting part 1400 forms the outer cup paper by using the original paper through an outer paper cup forming means placed on the paper transporting path and provides the outer cup paper to the outer cup forming part 1100.

Alternatively, the outer cup paper transporting part 1400 may directly introduce the outer cup paper having been formed at a separate device into the outer cup forming part 1100.

Additionally, the outer cup paper transporting part 1400 may further include a second hot-melt spraying nozzle 1410 which applies hot-melt on an outer surface of the overlapping portion of the outer cup paper. Herein, the second hot-melt spraying nozzle 1410 may apply multiple layers of hot-melt.

And, a structure of an outer cup transporting part 1200 of the device 1000 for manufacturing the double-walled paper cup in accordance with the present disclosure will be described by referring to FIG. 2.

Figure 2:
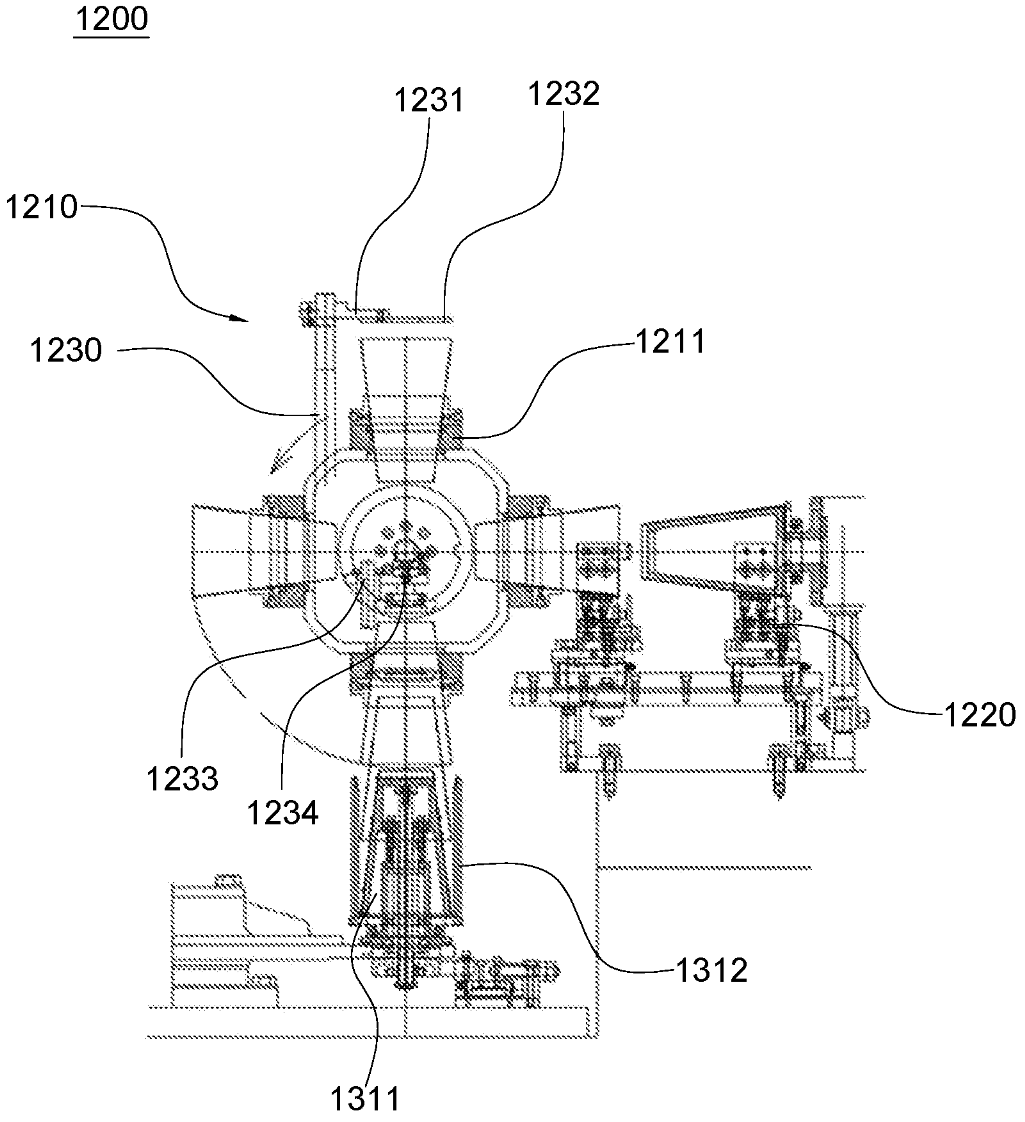
FIG. 2 is a drawing schematically illustrating a side view of an outer cup transporting part of the device for manufacturing the double-walled paper cup in accordance with one example embodiment of the present disclosure.

FIG. 2 is a drawing schematically illustrating a side view of the outer cup transporting part 1200 of the device for manufacturing the double-walled paper cup in accordance with one example embodiment of the present disclosure.

Referring to FIG. 2, the device 1000 for manufacturing the double-walled paper cup may include an outer cup transporting part 1200 which has: a rotational transporting means 1210 which rotates intermittently around its horizontal axis horizontal to the ground and forms at least one pair of circular slits in an outer circumference thereof, wherein the circular slits in one pair is formed to be symmetrical with respect to its horizontal axis. While FIG. 2 shows the rotational transporting means 1210 with two pairs of the circular slits, the present disclosure is not limited to this configuration. Also, respective diameters of the circular slits may be smaller than a diameter of an upper portion of the outer cup and larger than a diameter of a lower portion of the outer cup. The shape of the rotational transporting means 1210 may be square, but the present disclosure is not limited to this configuration. For example, the rotational transporting means 1210 may be in the shape of polygons such as octagon with circular slits on its respective sides.

Next, the outer cup transporting part 1200 may include an outer cup inserting means 1220 which takes the outer cup from the specific outer cup mandrel to insert the outer cup (starting from the lower portion of the outer cup) into a specific circular slit when the specific outer cup mandrel with the outer cup being surrounded is arrived at an outer cup ejecting station 1700 of the outer cup forming part. As an example, in a state where the outer cup is introduced into the outer cup inserting means 1220 by closely attaching tongs of the outer cup inserting means 1220 to the specific outer cup mandrel, the tongs of the outer cup inserting means 1220 may move straight from the specific outer cup mandrel to the specific circular slit 1211 among the circular slits so as to introduce the outer cup to the specific circular slit. Herein, the tongs of the outer cup inserting means 1220 may be configured to contact half of the outer circumference of the outer cup, but the contacting region of the tongs may be varied. For example, the tongs may be configured to contact the whole outer circumference of the outer cup. Further, the outer cup inserting means 1220 may move in a reciprocating manner to repeatedly introduce the outer cup from one of the outer cup mandrels 1111 to one of the circular slits.

And, the outer cup transporting part 1200 may include a shaft 1230 that moves up and down in the vertical direction in response to a motion of a cam (not illustrated) and extends in the vertical direction. Further, the outer cup transporting part 1200 may include a first pusher 1232 that is connected to a first extension bar 1231 which is perpendicularly engaged with the shaft 1230, and that firmly restrains the outer cup inserted into the specific circular slit among the circular slits by pushing the upper portion of the outer cup toward the specific circular slit. Herein, the specific circular slit and a particular circular slit that is symmetrical to the specific circular slit may form a line that is perpendicular to the ground (in other words, a center of the symmetrical pair of circular slits may form a line perpendicular to the ground). Herein, the first pusher 1232 pushes the outer cup positioned in the specific circular slit 1211 at the upper part of the outer cup transporting part 1200 (in FIG. 2) among the circular slits. In other words, the first pusher 1232 pushes the outer cup to be introduced deeply into the specific circular slit, making the outer cup to be more stably positioned in the specific circular slit.

Also, the outer cup transporting part 1200 may include a second pusher 1234, engaged with a movable rack gear 1240-3 of a rack-pinion gear wherein a pinion gear 1240-2 in the rack-pinion gear is engaged with a second extension bar 1233 perpendicularly engaged with the shaft 1230, for separating the outer cup which has been firmly restrained in the specific circular slit 1211 (herein, the outer cup is separated when the specific circular slit 1211 is arrived at a position of the second pusher 1234) by pushing the lower portion of the outer cup to an outside of the specific circular slit 1211 with a stronger stroke than the first pusher 1232. Herein, the first pusher 1232 and the second pusher 1234 move correspondingly to the shaft 1230 which moves up and down in the vertical direction, and thus, the first pusher 1232 pushes the outer cup, e.g., a first outer cup, deeply into the specific circular slit 1211 when the specific circular slit 1211 is placed at the first pusher 1232 and at the same time the second pusher 1234 pushes and separates another outer cup, e.g., a second outer cup, from another circular slit which faces away from the specific circular slit 1211. Since the outer cup transporting part 1200 is rotated, the specific circular slit 1211 may arrive at a position near the second pusher 1234 at a later time and then the second pusher 1234 will pushes and separates the specific outer cup from the specific circular slit 1211.

Next, the device 1000 for manufacturing the double-walled paper cup may include an outer cup combining part 1300. Herein, the outer cup combining part 1300 has a rotating table 1310 that rotates intermittently and is radially provided with a plurality of rotatable inner cup mandrels 1311. Herein, the rotatable inner cup mandrels 1311 may have their corresponding central axes vertical to the ground.

Also, the outer cup combining part 1300 may include a rotating pocket 1303 which is configured to rotate a specific inner cup mandrel among the inner cup mandrels 1311 by contacting a specific driving shaft 1230 of the specific inner cup mandrel that extends to a lower outer region of the rotating table 1310 while the specific inner cup mandrel with the inner cup being provided thereto is located at a hot-melt station 1800. Detailed configurations of the rotating pocket 1303 will be explained later.

Further, the outer cup combining part 1300 may include a first hot-melt spraying nozzle 1320 that applies the hot-melt to an outer surface of the inner cup rotated by a rotation of the specific inner cup mandrel. Herein, the first hot-melt spraying nozzle 1320 may apply the hot-melt with multiple layers.

In a state where the inner cup with the hot-melt applied on its outer surface is positioned at a combining station, the outer cup combining part 1300 may initially combine the outer cup (separated from the specific circular slit by the second pusher 1234) with the inner cup. Herein, the rotating table 1310 may further include a mandrel guide 1312 that guides a moving path of the outer cup (separated from the specific circular slit by the second pusher 1234) along a plurality of guide bars vertically mounted thereon, wherein the guide bars are radially provided around the specific inner cup mandrel.

Additionally, the outer cup combining part 1300 may further include a combining pusher that receives the specific inner cup mandrel with the outer cup being initially, i.e., loosely, combined with the inner cup from the combining station and then applies pressure to the outer cup initially combined with the inner cup to thereby make a double-walled paper cup having the outer cup fixedly combined with the inner cup. Herein, multiple combining pushers may be used to apply pressure multiple times such that the outer cup can be placed precisely on an optimal position of the outer surface of the inner cup.

Next, configurations of the second pusher 1234 and the second extension bar 1233 will be explained referring to FIGS. 3 and 4.

Figure 3:
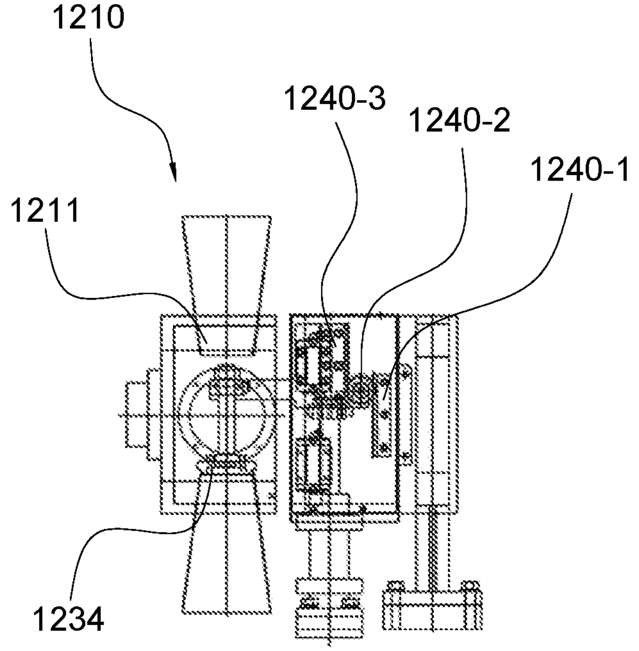
FIG. 3 is a drawing schematically illustrating another side view of the outer cup transporting part of the device for manufacturing the double-walled paper cup in accordance with one example embodiment of the present disclosure.

FIG. 3 is a drawing schematically illustrating another side view of the outer cup transporting part 1200 of the device for manufacturing the double-walled paper cup in accordance with one example embodiment of the present disclosure.

Figure 4:
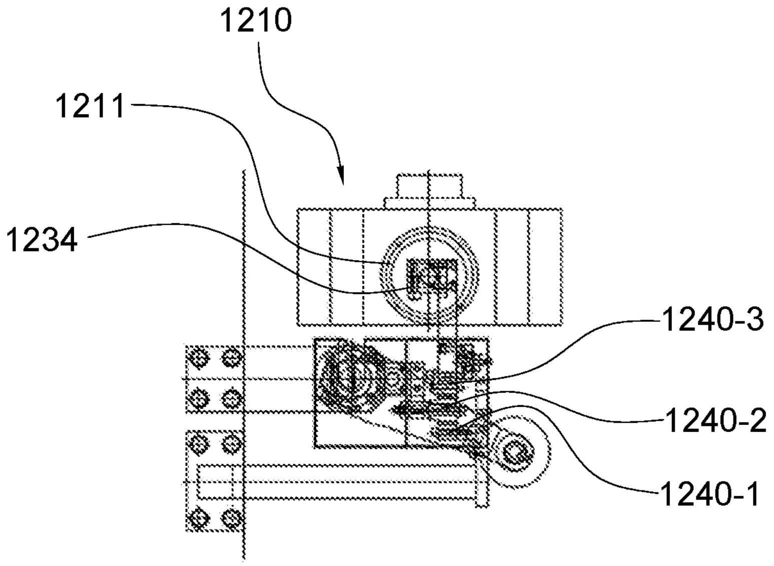
FIG. 4 is a drawing schematically illustrating a plane view of the outer cup transporting part of the device for manufacturing the double-walled paper cup in accordance with one example embodiment of the present disclosure.

FIG. 4 is a drawing schematically illustrating an plane view of the outer cup transporting part 1200 of the device for manufacturing the double-walled paper cup in accordance with one example embodiment of the present disclosure.

By referring to FIGS. 3 and 4, the rack-pinion gear may include a fixed rack gear 1240-1, the pinion gear 1240-2 and the movable gear 1240-3. Herein, the fixed rack gear 1240-1 contacts the pinion gear 1240-2, and the movable rack gear 1240-3 contacts the pinion gear 1240-2 at a position symmetrical to the fixed rack gear 1240-1 with respect to the pinion gear 1240-2. In this construction, the fixed rack gear 1240-1 is fixed, and the pinion gear 1240-2 moves up and down with identical height of the up and down movement of the shaft 1230 since the pinion gear 1240-2 is directly connected to the second extension bar 1233 which moves up and down according to the movement of the shaft 1230. Herein, the movable rack gear 1240-3 which is in contact with the pinion gear 1240-2 moves in the same direction with the pinion gear 1240-2 but with longer vertical distance of the up-and-down movement than the pinion gear 1240-2. Therefore, the second pusher 1234 engaged with the movable rack gear 1240-3 moves up and down with longer vertical distance of the up-and-down movement than the second extension bar 1233 engaged with the pinion gear 1240-2. This makes the stroke of the second pusher 1234 stronger than the first pusher 1232.

Next, the rotation of the outer cup combining part 1300 will be described referring to FIG. 5.

Figure 5:
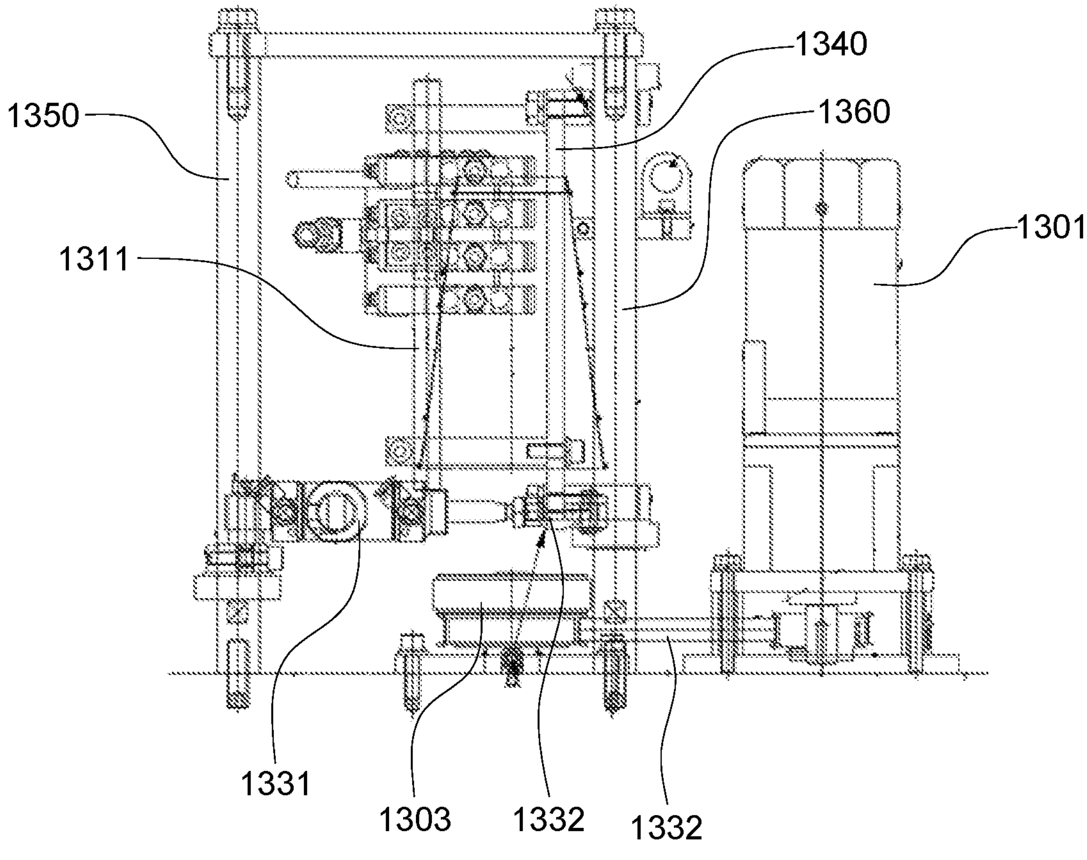
FIG. 5 is a drawing schematically illustrating a vicinity of a hot-melt spraying nozzle of an outer cup combining part of the device for manufacturing the double-walled paper cup in accordance with one example embodiment of the present disclosure.

FIG. 5 is a drawing schematically illustrating a vicinity of the hot-melt spraying nozzle 1320 of the outer cup combining part 1300 of the device for manufacturing the double-walled paper cup in accordance with one example embodiment of the present disclosure.

By referring to FIG. 5, the outer cup combining part 1300 may include: a motor 1301 which provides driving force; a belt 1302 engaged with the motor 1301; and the rotating pocket 1303 which is connected to the belt 1302 and rotates in response to the movement of the belt 1302 according to the drive of the motor 1301. Herein, the rotating pocket 1303 rotates the specific inner cup mandrel by contacting the lower part of the specific inner cup mandrel located in the hot melt station. In other words, the motor 1301 may be driven first, the belt 1302 whose one end is engaged with the motor 1301 and whose the other end is engaged with the rotating pocket 1303 rotates the rotating pocket 1303 by the drive of the motor 1301. Thereafter, the rotation of the rotating pocket 1303 contacting the lower part of the specific inner cup mandrel may rotate the specific inner cup mandrel. Using the first hot-melt spraying nozzle 1320 on the specific inner cup mandrel (which is rotating) may allow the hot-melt to be applied on the whole outer circumference of the inner cup.

Additionally, the outer cup combining part 1300 may further include a preliminary hot-melt spraying nozzle 1330 that applies preliminary hot-melt on the outer surface of the inner cup which is being rotated by the rotation of the specific inner cup mandrel (when the hot-melt is not yet applied by the first hot-melt spraying nozzle 1320). Herein the preliminary hot-melt spraying nozzle 1320 maintains a predetermined distance from the inner cup at a preliminary hot-melt station 1900. Herein, material of the preliminary hot-melt may be identical to the hot-melt. Also, the outer cup combining part 1300 may further include a cooling means that cools the preliminary hot-melt applied on the inner cup and then transports it to the hot-melt station 1800. Herein, the hot-melt may be applied on the cooled down preliminary hot-melt. By applying the preliminary hot-melt with the preliminary hot-melt spraying nozzle 1330 and additional hot-melt with the first hot-melt spraying nozzle 1320 to make a hot-melt layer thicker, the distance between the inner cup and the outer cup may be increased, which leads to improved insulation of the double-walled paper cup. Further, multiple preliminary hot-melt stations and cooling stations may be used to make the hot-melt layer even thicker.

Next, configurations of returning the hot-melt spraying nozzle 1320 to its initial position will be described referring to FIGS. 5 to 7.

Figure 6:
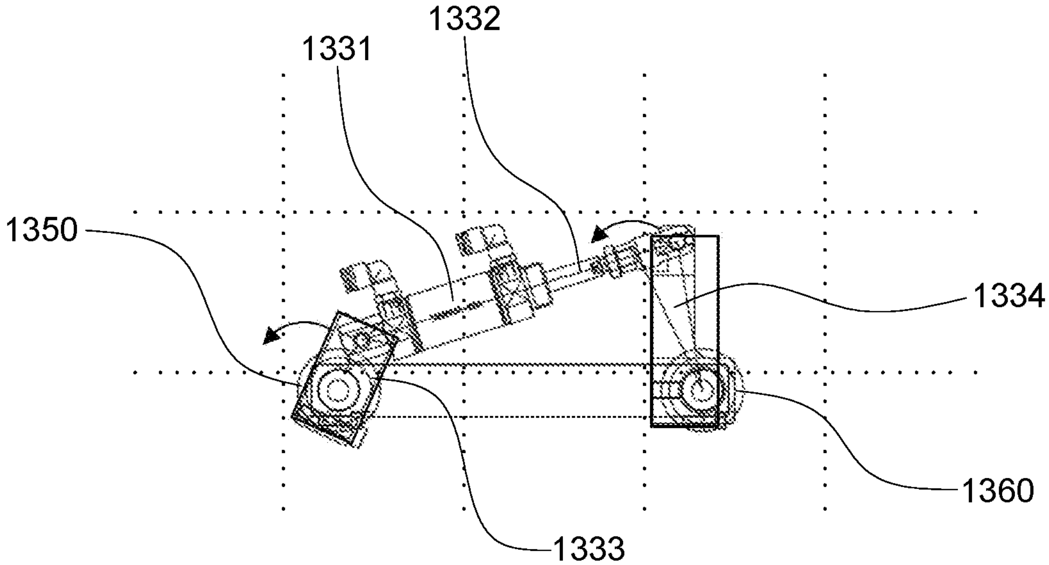
FIG. 6 is a drawing schematically illustrating a cylinder of the device for manufacturing the double-walled paper cup in accordance with one example embodiment of the present disclosure.

FIG. 6 is a drawing schematically illustrating a cylinder of the device for manufacturing the double-walled paper cup in accordance with one example embodiment of the present disclosure.

Figure 7:
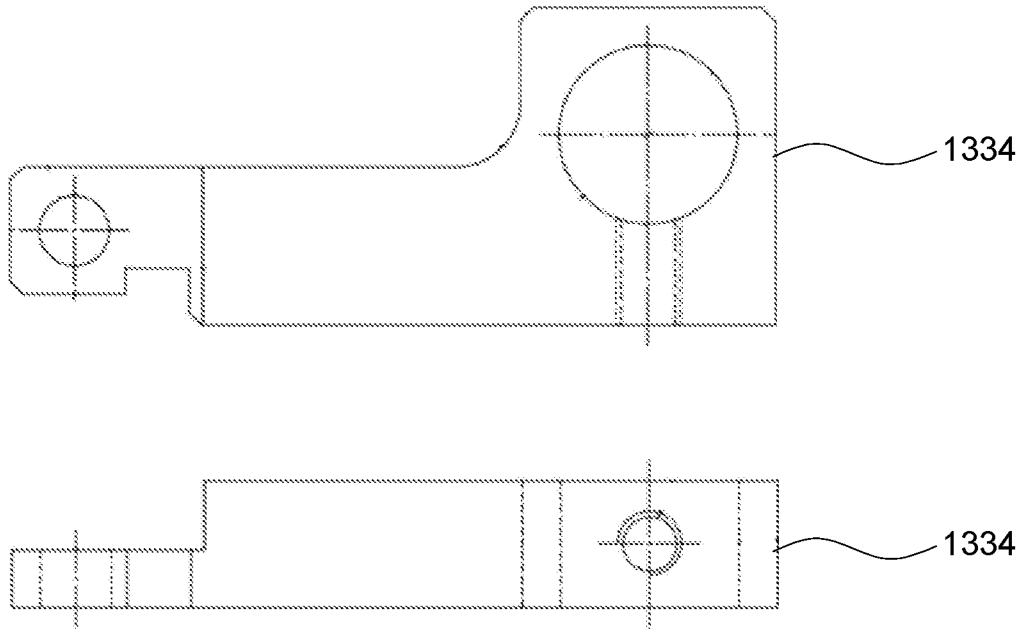
FIG. 7 is a drawing schematically illustrating a second mounting block of the device for manufacturing the double-walled paper cup in accordance with one example embodiment of the present disclosure.

FIG. 7 is a drawing schematically illustrating a second mounting block 1334 of the device for manufacturing the double-walled paper cup in accordance with one example embodiment of the present disclosure.

By referring to FIGS. 5 and 6, the outer cup combining part 1300 may further include: a first mounting block 1333 whose one end is rotatably engaged with a first fixed shaft 1350; the second mounting block 1334 whose one end is rotatably engaged with a second fixed shaft 1360, wherein a nozzle base 1340 with the first hot-melt spraying nozzle 1320 being rotatably combined is engaged with the second fixed shaft 1360 and wherein the nozzle base 1340 is fixedly engaged with a side of said one end of the second mounting block 1334; and a cylinder whose body 1331 is rotatably engaged with the other end of the first mounting block 1333 and whose rod 1332 is rotatably engaged with the other end of the second mounting block 1334. Herein, the first fixed shaft 1350 and the second fixed shaft 1360 are fixed shafts to support the whole hot-melt spraying module including the first hot-melt spraying nozzle 1320. Also, the nozzle base 1340 maintains the initial position, and when a force exceeding the predetermined threshold is applied, each of the mounting blocks 1333, 1334 may be rotated at each of the fixed shafts 1350, 1360. In addition, the nozzle base 1340 may be rotatably engaged with the second fixed shaft 1360 through at least one additional mounting block in addition to the second mounting block 1334.

By referring to FIG. 7, the second mounting block 1334 may include a screw hole on the side of the hole which is engaged with the second fixed shaft 1360, and the nozzle base 1340 may be coupled with the second mounting block 1334 through the screw hole. Although the screw hole is placed on the side of the hole which is engaged with the second fixed shaft 1360 in FIG. 7, the screw hole may be at any side of one end of the second mounting block 1334.

Herein, the position of the first hot-melt spraying nozzle 1320 may be adjusted according to the movement of the cylinder. For example, the rod 1332 of the cylinder may be in a maximum tension at the initial position of the first hot-melt spraying nozzle 1320. Herein, the initial position is a position where the first hot-melt spraying nozzle 1320 has a predetermined distance from the inner cup.

Meanwhile, in case the position of the inner cup is displaced or two inner cups are wrongfully provided to one inner cup mandrel due to some mechanical errors, the predetermined distance between the inner cup and the first hot-melt spraying nozzle 1320 cannot be maintained. In this case, wrongfully placed inner cup may collide with the first hot-melt spraying nozzle 1320, thereby changing the position of the first hot-melt spraying nozzle 1320. Further, the position of the nozzle base 1340 is also changed due to the change of the position of the first hot-melt spraying nozzle 1320. This causes the first mounting block 1333 and the second mounting block 1334 to rotate around the first fixed shaft 1350 and the second fixed shaft 1360 respectively. Also, the rotation of the first mounting block 1333 and the second mounting block 13444 causes the rod 1332 of the cylinder to shrink.

In this state, in order to return the position of the first hot-melt spraying nozzle 1320 to its initial position, a fluid is inputted to the cylinder to return the rod 1332 of the cylinder to the maximum tension. Therefore, as the rod 1332 of the cylinder returns to its maximum tension, the nozzle base 1340 rotates to its initial position, which causes the first hot-melt spraying nozzle 1320 to return to its initial position as well.

The present disclosure has an effect of combining the inner cup and the outer cup precisely by allowing the second pusher to have a stronger stroke than a first pusher through a rack-pinion gear so as to allow the second pusher to push the outer cup strongly toward the inner cup.

The present disclosure has another effect of returning a hot-melt spraying nozzle to its initial position using the cylinder when the hot-melt spraying nozzle is out of its initial position.

The present disclosure has still another effect of preventing the outer cup from escaping out of its predetermined position by using a mandrel guide mounted on the rotating table of the inner cup mandrel in order to accurately combine the outer cup with the inner cup.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A device for manufacturing a double-walled paper cup by combining an inner cup and an outer cup using hot-melt comprising:

an outer cup forming part which includes: a turret that rotates intermittently around a vertical axis perpendicular to a ground and is radially provided with a plurality of outer cup mandrels that have their corresponding central axes horizontal to the ground; and an enclosing means which is configured to allow an outer cup paper to surround a specific outer cup mandrel among the outer cup mandrels at an enclosing station, to thereby form an outer cup with a tapered shape;

an outer cup transporting part which includes: a rotational transporting means which rotates intermittently around its horizontal axis horizontal to the ground and has a plurality of circular slits, wherein respective diameters of the circular slits are smaller than a diameter of an upper portion of the outer cup and larger than a diameter of a lower portion of the outer cup; an outer cup inserting means which takes the outer cup from the specific outer cup mandrel to insert the outer cup into a specific circular slit starting from the lower portion of the outer cup when the specific outer cup mandrel with the outer cup being surrounded is arrived at an outer cup ejecting station of the outer cup forming part; a shaft that moves up and down in the vertical direction in response to a motion of a cam and extends in the vertical direction; a first pusher that is connected to a first extension bar which is perpendicularly engaged with the shaft, and that firmly restrains the outer cup inserted into the specific circular slit among the circular slits by pushing the upper portion of the outer cup toward the specific circular slit; and a second pusher, engaged with a movable rack gear of a rack-pinion gear wherein a pinion gear in the rack-pinion gear is engaged with a second extension bar perpendicularly engaged with the shaft, for separating the outer cup which has been firmly restrained in the specific circular slit when the specific circular slit is arrived at a position of the second pusher by pushing the lower portion of the outer cup to an outside of the specific circular slit with a stronger stroke than the first pusher; and an outer cup combining part which includes: a rotating table that rotates intermittently and is radially provided with a plurality of rotatable inner cup mandrels; a rotating pocket which is configured to rotate a specific inner cup mandrel among the inner cup mandrels by contacting a specific driving shaft of the specific inner cup mandrel that extends to a lower outer region of the rotating table while the specific inner cup mandrel with an inner cup being provided thereto is located at a hot-melt station and the inner cup is applied with hot-melt at the hot-melt station; and a first hot-melt spraying nozzle that applies the hot-melt to an outer surface of the inner cup rotated by a rotation of the specific inner cup mandrel, wherein in a state where the inner cup provided with the hot-melt applied on its outer surface is positioned at a combining station, the outer cup separated from the specific circular slit by the second pusher is initially combined with the inner cup.

2. A device according to claim 1, wherein the outer cup combining part further includes: a first mounting block whose one end is rotatably engaged with a first fixed shaft; a second mounting block whose one end is rotatably engaged with a second fixed shaft, wherein a nozzle base with the first hot-melt spraying nozzle being rotatably combined is engaged with the second fixed shaft and wherein the nozzle base is fixedly engaged with a side of said one end of the second mounting block; and a cylinder whose body is rotatably engaged with the other end of the first mounting block and whose rod is rotatably engaged with the other end of the second mounting block, wherein a position of the first hot-melt spraying nozzle engaged with the nozzle base is adjusted according to a movement of the cylinder.

3. A device according to claim 1, wherein the rotating table further includes: a mandrel guide that guides a moving path of the outer cup separated from the specific circular slit by the second pusher along a plurality of guide bars vertically mounted thereon, wherein the guide bars are radially provided around the inner cup mandrel.

4. A device according to claim 1, further comprising: an outer cup paper transporting part that transports an original paper along a paper transporting path by using at least one motor, and wherein the outer cup paper transporting part transforms the original paper to the outer cup paper by using an outer paper cup forming means placed on the paper transporting path and provides the outer cup paper to the outer cup forming part.

5. A device according to claim 4, wherein the outer cup paper transporting part further includes: a second hot-melt spraying nozzle which applies hot-melt on an outer surface of an overlapping portion of the outer cup paper.

6. A device according to claim 1, wherein the enclosing means includes: a folding wing that allows the outer cup paper to surround the specific outer cup mandrel when the outer cup paper is arrived at a lower part of the specific outer cup mandrel; and a seam clamp configured to apply pressure to an overlapping portion of the outer cup paper.

7. A device according to claim 1, wherein the outer cup combining part further includes: a preliminary hot-melt spraying nozzle that applies preliminary hot-melt on the outer surface of the inner cup rotated by the rotation of the specific inner cup mandrel when the hot-melt is not yet applied by the first hot-melt spraying nozzle, wherein the preliminary hot-melt spraying nozzle maintains a predetermined distance from the inner cup at a preliminary hot-melt station; and a cooling means that cools the preliminary hot-melt applied on the inner cup and then transports it to the hot-melt station.

8. A device according to claim 1, wherein the outer cup forming part further includes: a curling part that receives the specific outer cup mandrel with the outer cup paper being surrounded from the enclosing station and that curls a lower end of the outer cup inwards so as to form a curl, wherein the curl makes space between the inner cup and the outer cup at a time when the outer cup is combined with the inner cup.

9. A device according to claim 1, wherein the outer cup combining part further includes: a combining pusher that receives the specific inner cup mandrel with the inner cup being initially combined with the outer cup from the combining station and then applies pressure to the outer cup initially combined with the inner cup to thereby make a double-walled paper cup having the outer cup fixedly combined with the inner cup.

10. A device according to claim 1, wherein the rack-pinion gear includes a fixed rack gear, the pinion gear and the movable gear which is connected to the second pusher, wherein the fixed rack gear contacts the pinion gear, and the movable rack gear contacts the pinion gear at a position symmetrical to the fixed rack gear with respect to the pinion gear, and wherein the movable rack gear is configured to move in a same direction with a direction of a movement of the pinion gear according to the movement of the shaft.

* * * * *